Nov. 15, 1966   B. W. BRUNDAGE   3,285,630
TORQUE ARM SWIVEL UNIT

Filed Nov. 14, 1963   3 Sheets-Sheet 1

INVENTOR.
BENJAMIN W. BRUNDAGE
BY
His ATTORNEYS

Nov. 15, 1966   B. W. BRUNDAGE   3,285,630
TORQUE ARM SWIVEL UNIT

Filed Nov. 14, 1963   3 Sheets-Sheet 2

INVENTOR.
BENJAMIN W. BRUNDAGE
BY
HIS ATTORNEYS

Nov. 15, 1966  B. W. BRUNDAGE  3,285,630
TORQUE ARM SWIVEL UNIT

Filed Nov. 14, 1963  3 Sheets-Sheet 3

INVENTOR.
BENJAMIN W. BRUNDAGE
BY
HIS ATTORNEYS 3,285,630
TORQUE ARM SWIVEL UNIT
Benjamin W. Brundage, Piedmont, Calif.
(98 Westminster Drive, Oakland, Calif.)
Filed Nov. 14, 1963, Ser. No. 328,771
3 Claims. (Cl. 285—181)

This application is a continuation-in-part of application Serial No. 238,642 filed November 19, 1962, now abandoned.

This invention relates to a torque arm gear-driven swivel unit.

Swivel units are employed in various fields of use, one of which is that of a loading dock whereat a liquid product is transferred from a supply to some transport means such as a barge or truck. In this environment, the swivel joint permits the discharge hose or nozzle to be raised or lowered or otherwise maneuvered so that it can be positioned properly for loading and thereafter moved to a position in which it does not interfere with movement of the transport device and is out of the way. In the past it has been usual to provide these swivel joints with various counterweight, counterbalance arms, cables or pulleys so that the discharge line can be suitably maneuvered and this in a free and easy manner. In accordance with this invention the need for such counterweights and the like is eliminated for I provide a swivel joint construction which can be readily and positively moved.

The device is not limited in application to swivel joints provided on a loading dock for it can be used in a fire monitor, in hydraulic dredging, on a swing line inside or outside of a tank and on a skimming pond. Additionally, it can be used with any type of swivel fitting.

It is in general the broad object of the present invention to provide an improved swivel unit, particularly one in which it is possible to rotate the unit positively through any desired degree of rotation.

The invention includes other objects and features of advantage, some of which, together with the foregoing, will appear hereinafter wherein the present preferred form of gear-driven swivel unit is disclosed.

In the drawing accompanying and forming a part hereof:

Figure 1:
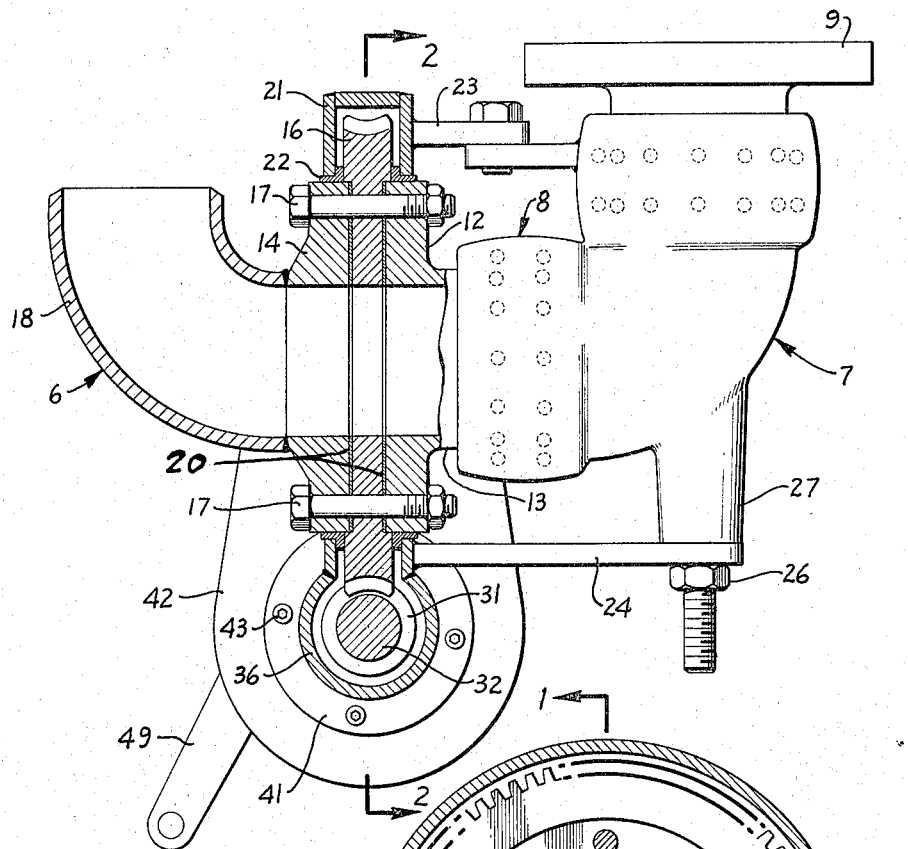
FIGURE 1 is an elevation, partially in section, taken along the line 1—1 of FIGURE 2.

Referring particularly to the drawing, I have shown a swivel joint in which an outlet portion generally indicated at 6 is mounted for rotation with respect to a body portion generally indicated at 7, the rotation being made possible by inclusion of a bearing structure generally indicated at 8. The body portion 7 is shown in the form of an elbow provided with a flange 9, but any other form of fitting can be employed. The bearing structure 8 can be any one of those well known in the art such as that sold under the trademark "Chiksan." The outlet or discharge portion 6 is shown as an L, but again this can be any type of outlet desired.

The outlet portion 6 includes a flange 12 integral with a rotatable member 13 extending from the bearing structure 8. A like flange 14 is provided on the outlet 6 while intermediate flanges 12 and 14 a worm wheel 16 is provided. The flanges 12 and 14 and wheel 16 are secured together by bolts 17. An asbestos ring gasket 20 is provided between the worm wheel and each of flanges 12 and 14 so that when the bolts 17 are made tight the resulting assembly is fluid-tight and liquids under pressure can be pumped without leakage. The discharge member 18 of outlet 6 is mounted on one side of the flange 14 and, in the form depicted, is in the form of an L, but any other fitting can be employed.

A generally U-shaped housing 21 is mounted about the exterior of flanges 12 and 14 to provide a cover for the worm wheel, a bronze bushing 22 being interposed between the housing and the flanges. The housing 21 is fixed to the body portion 7 by a first support 23 between one side of the circular housing 21 and the body portion 7 as is shown in FIGURE 1. On the opposite side of housing 21 a support 24 is provided between the housing and an extension 27 on the body portion 7 to which it is secured by bolt 26.

For rotating the worm wheel 16, I provide a worm 31 on shaft 32, the latter being supported in bearings 33 and 34 mounted in housing 36 which is secured to the circular housing 21. Bearing 33 fits against a shoulder on the shaft 32 and is secured in position in housing 36 by an abutting disc 37. Stud 38 projects from housing end 39 and maintains the disc in adjustment so that the worm 31 engages the worm wheel in proper alignment. At the other end of housing 36 a ring 41 is secured as by welding. A gear case 42 is mounted on the ring 41 by studs 43. The gear case includes a first gear 46 mounted on an end of shaft 32 and driven by a smaller gear 47 mounted upon a shaft 48 mounted in the gear case having a crank handle 49.

Upon rotation of the crank shaft 49, the worm wheel 16 is rotated to turn outlet 6 relative to the body portion 7 through any desired degree of rotation. Thus, in contrast to those units available heretofore, the outlet 6 and any hose or nozzle carried thereby can be moved through any desired degree of rotation without the danger of threads or set screws becoming unscrewed. By proper choice of the body portion 7 and the discharge portion 6 it is possible for the device to be manufactured in either a right or a left hand style. Also, it is possible to provide the unit for bottom entry or top entry merely by changing the torque arm or by reversing the torque arm. If the unit is used in one particular type of service so that the worm wheel becomes worn in a given portion, it is possible to rotate the worm wheel relative to the unit merely by first loosening the several bolts which secure the unit together, turning the worm wheel and returning the bolts.

Figure 2:
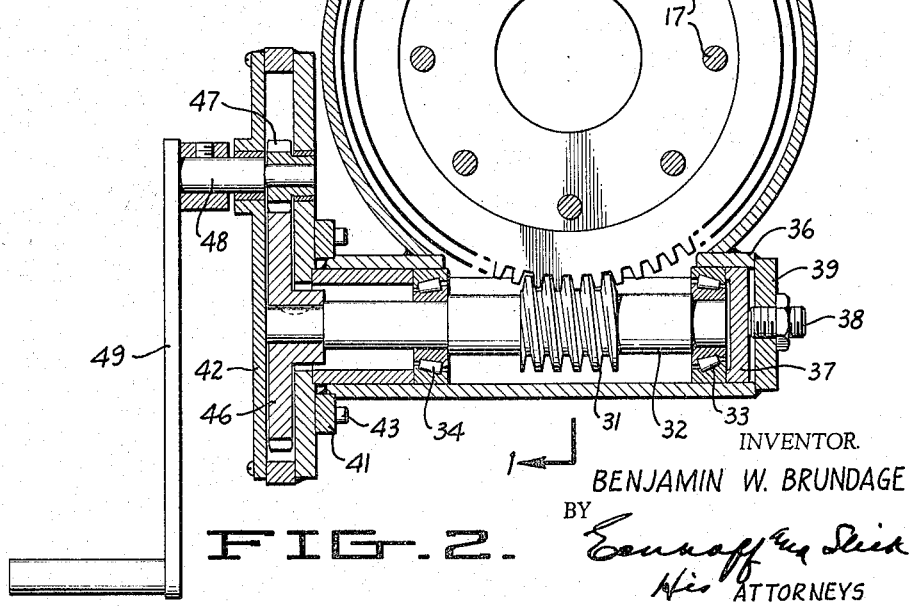
FIGURE 2 is a side view taken along the line 2—2 in FIGURE 1.
Figure 3:
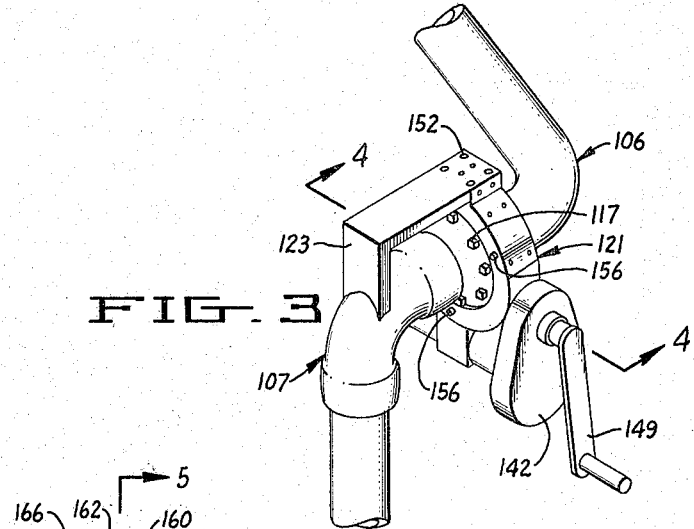
FIGURE 3 is a perspective view, in reduced dimensions, of a modified version of the structure of this invention.
Figure 4:
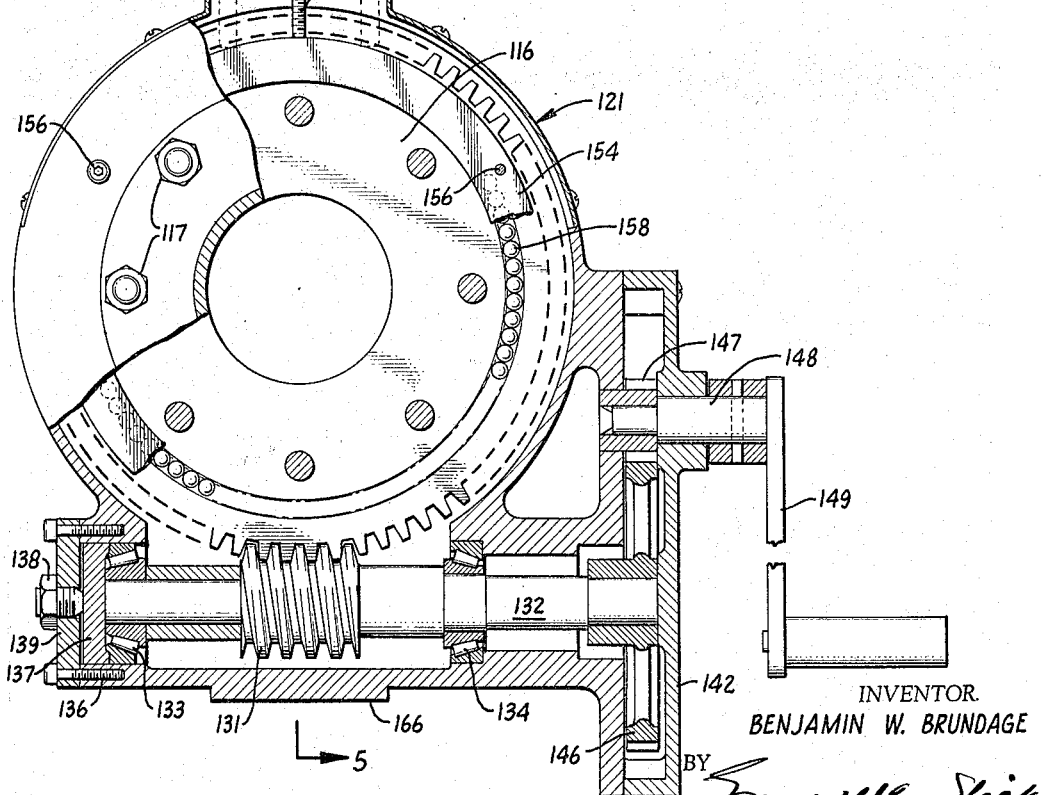
FIGURE 4 is an enlarged sectional view through the line 4—4 of FIGURE 3.
Figure 5:
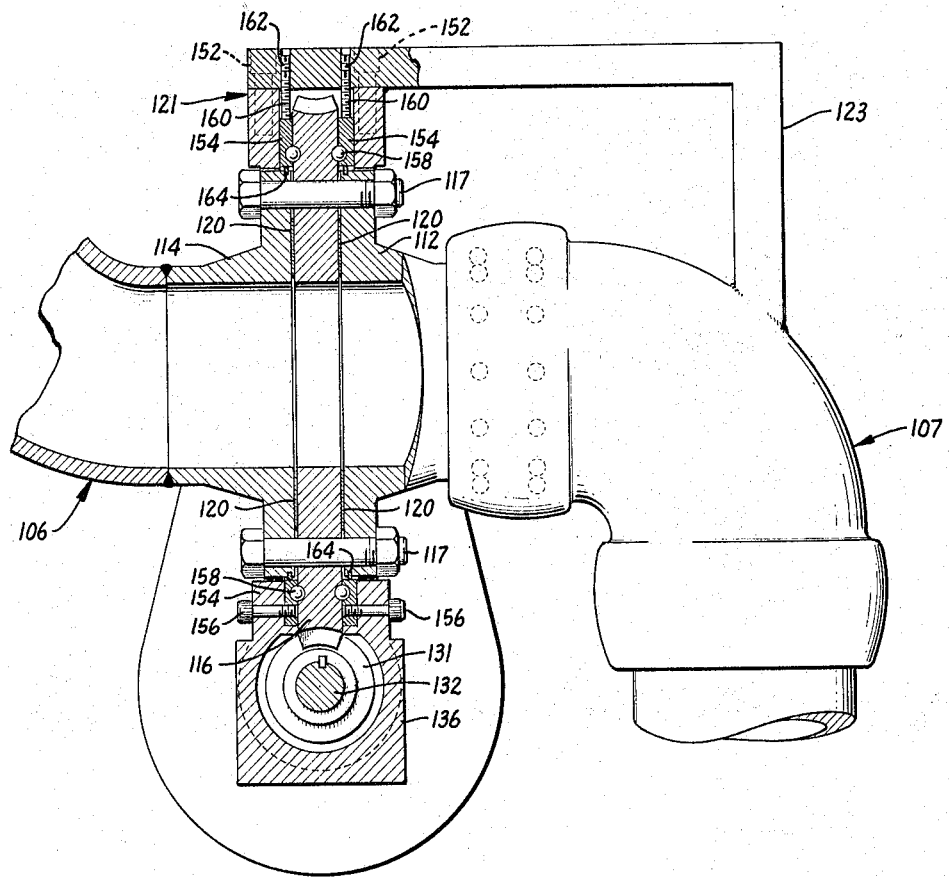
FIGURE 5 is a sectional view through line 5—5 of FIGURE 4.

In FIGURES 3-5 an alternate form of the structure of this invention is shown. The various characters on the drawing falling between 106 and 150 correspond to 6-50 in FIGURES 1 and 2 except that they have been increased by 100.

The support 123 is held in place by screws 152 which are tapped into the housing 121. The two bearing races 154 rest against shoulders machined in housing 121. The races are secured in place by means of machine screws 156. Any binding between the housing 121 and the ring gear 116 is, therefore, eliminated by the action of the ball bearings 158. The ball races are additionally locked in place by means of Allen head set screws 160, each screw in turn being locked by means of a second Allen head screw 162. A felt oil retainer 164 spaces either ball race from its respective flange 112 or 114 and prevents leakage of oil.

As seen particularly in FIGURE 4, there is provided both above and below the housing a flat pad 166 which may be tapped for receipt of screws to permit the support 123 to be secured to either side of the housing 121. The housing may thus be rotated 180° from the position seen in FIGURES 3, 4 and 5, so that the crank handle 149 will fall on the other side from the position as seen in the aforementioned figures.

The operation of this embodiment is essentially the same as that of FIGURES 1 and 2 as described above.

From the foregoing, I believe it will be apparent that I have provided a novel, simple and improved gear-driven swivel joint capable of wide application.

I claim:

1. In a swivel joint joining sections of conduit for the transport of fluid, at least one of said sections having an elbow therein adjacent said joint, and having means permitting rotation of said elbow relative to a portion of another section, the improvements comprising:

(a) adjacent spaced flanges on the section having an elbow therein;

(b) a gear housing encircling the said flanges and bridging the distance therebetween;

(c) means for fixing said another section of conduit against rotation relative to the said housing, said another section and said elbow containing section being relatively rotatable and having a fluid tight seal therebetween;

(d) a worm wheel within said housing and in the space between the said flanges mounted concentrically about one of said sections of conduit and fixed to each of said flanges, said worm wheel and flanges having a fluid tight seal therebetween, said sections, elbow, housing, flanges and worm wheel all having concentric communicating bores therethrough;

(e) bearings between the said housing and each side of said worm wheel permitting relative rotation thereof;

(f) a worm journaled in said housing and in engagement with said worm wheel; and (g) a means for rotating said worm.

2. The device as set forth in claim 1 wherein said bearings are disposed between each of said flanges and a part of said housing.

3. The device as set forth in claim 1 wherein said bearings are disposed within said housing and engage each side face of said worm wheel.

References Cited by the Examiner

UNITED STATES PATENTS

| 513,167 | 1/1894 | Woodhouse | 285—181 X |
| 623,341 | 4/1899 | Steck | 285—181 X |

FOREIGN PATENTS 1,095,617  12/1954  France.

CARL W. TOMLIN, *Primary Examiner.*

S. R. MILLER, D. W. AROLA, *Assistant Examiners.*